United States Patent
Antony et al.

(10) Patent No.: US 9,563,736 B2
(45) Date of Patent: Feb. 7, 2017

(54) PLACEMENT AWARE FUNCTIONAL ENGINEERING CHANGE ORDER EXTRACTION

(71) Applicant: International Business Machines Corporation, Armonk, NY (US)

(72) Inventors: George Antony, Cochin (IN); Pinaki Chakrabarti, Bangalore (IN); Haoxing Ren, Austin, TX (US); Sourav Saha, Barrackpur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/186,546

(22) Filed: Feb. 21, 2014

(65) Prior Publication Data

US 2015/0242559 A1  Aug. 27, 2015

(51) Int. Cl.
*G06F 9/455*  (2006.01)
*G06F 17/50*  (2006.01)

(52) U.S. Cl.
CPC ....... *G06F 17/5081* (2013.01); *G06F 17/5072* (2013.01); *G06F 17/5077* (2013.01)

(58) Field of Classification Search
CPC .............. G06F 17/5068; G06F 17/5054; G06F 17/5072; G06F 17/5077; G06F 2217/72; G06F 17/5081; G06F 2217/04; G06F 2217/08; G06F 2217/12; G06F 2217/84
See application file for complete search history.

(56) References Cited

U.S. PATENT DOCUMENTS

| | | | |
|---|---|---|---|
| 6,530,073 B2 | 3/2003 | Morgan | |
| 7,555,737 B2 | 6/2009 | Liu et al. | |
| 7,610,568 B2 | 10/2009 | Alter et al. | |
| 7,644,382 B2 | 1/2010 | Budumuru | |
| 8,214,774 B2 | 7/2012 | Nardone et al. | |
| 2006/0026546 A1* | 2/2006 | Dinter | G06F 17/50 716/113 |
| 2009/0172620 A1* | 7/2009 | Yoshida | G06F 17/5031 716/113 |
| 2009/0178013 A1* | 7/2009 | Wang | G06F 17/5045 716/132 |
| 2010/0275167 A1 | 10/2010 | Fu et al. | |
| 2012/0144353 A1* | 6/2012 | Kamdar | G06F 17/5031 716/108 |
| 2013/0298097 A1 | 11/2013 | Chang et al. | |

OTHER PUBLICATIONS

Disclosed anonymously, (Sep. 2012). Adaptive ECO planning by use of spare pins, localized standard cell duplication and factoring in timing, congestion and logic circuitry. IPCOM000221345D pp. 1-8.

* cited by examiner

*Primary Examiner* — Nha Nguyen
(74) *Attorney, Agent, or Firm* — Cantor Colburn LLP; William A. Kinnaman, Jr.

(57) ABSTRACT

A computer implemented method for designing an integrated circuit includes receiving a netlist. The method also includes receiving physical layout information related to an integrated circuit based on the on the netlist and receiving an engineering change order (ECO) that changes at least one logical component of the physical layout. The method further includes forming two or more possible solutions to achieve the ECO, ranking the two or more possible solutions based on two or more factors and selecting the highest ranked solution.

10 Claims, 5 Drawing Sheets

PLACEMENT AWARE FUNCTIONAL ENGINEERING CHANGE ORDER EXTRACTION

BACKGROUND

The present invention relates generally to digital computing, and more particularly to a tool that takes into account real world constraints when implementing an Engineering Change Order (ECO).

Many microchip designs are crafted in similar processes. At the beginning stage of a typical design process, or "front end", a logic designer uses a Very High Speed Integrated Circuits (VHSIC) Design Language (VHDL) to generate a behavioral description of the chip or chip element. This behavioral description is abstracted to a fairly high level, such as the bus level, and lower-level constructs, such as pins and individual nets, are not present in the front end behavioral description.

The VHDL behavioral model then proceeds through a behavioral synthesizer to create a Register Transfer Language ("RTL") VIM (VLSI Integrated Model) netlist. This netlist is less abstract that the VHDL behavioral description, and represents, rather than buses, the individual wires connecting logic boxes. The netlist may be described in a text file that corresponds to the component. The netlist may be a derivative, through additional processing, of a file format that may be as described by Verilog, VHSIC Hardware Design Language (VHDL), among other high-level design languages. Verilog is a trademark of Cadence Design Systems.

The VHDL behavioral description also goes through a logical synthesis, which creates a physical design ("PD") VIM netlist that is forwarded to the physical designer. The physical designer is involved in the "back end" of the design process, where low-level design decisions are made.

The physical designer typically runs the PD VIM netlist through physical design tools, which places and routes the ultimate, low-level physical components of the chip, such as pins and wires. The design is ultimately sent to a foundry, where the masks for chip processing are finalized. Any changes to the physical chip layout are described in an Engineering Change Order (ECO).

More particularly, in chip design, ECO is the process of inserting a logic change directly into the netlist after it has already been processed by an automatic tool to form the actual layout. Before the chip masks are made, ECOs are usually done to save time, by avoiding the need for full ASIC logic synthesis, technology mapping, place, route, layout extraction, and timing verification.

Functional ECO extraction is indispensable to meet time-to market constraints in today's chip designs. A functional ECO extractor is a program that takes the placed and routed netlist makes changes to it to meet the needed change. There are several different types of ECO extractors and these will generally be called "ECO extractors" herein. Widely used objective functions that a ECO extractor uses include extracting the minimum number of gates and nets for the logical ECO change, stitching the extracted ECO logic to a proper logical point so that the expected functionality with changed logic is obtained, placing the gates to meet the logic of the ECO as well as routing of the ECO nets. Optimization of the ECO logic is typically done on the stitched netlist by the physical synthesis/optimization tool.

SUMMARY

Systems, computer program products and computer implemented methods for designing an integrated circuit are disclosed. In one embodiment, a functional ECO extractor is provided that takes into account congestion and density information related to the netlist as well as placement and timing constraints. In one embodiment, placement and timing information will be used to select candidate stitch points that provide acceptable timing. Further, a cell density map will be used to select stitch points that are closest to previously placed location to which the ECO is to be tied while consideration of congestion is also given.

In one embodiment, a method and computer program product include: receiving a netlist; receiving physical layout information related to a integrated circuit based on the on the netlist; receiving an engineering change order (ECO) that changes at least one logical component of the physical layout; forming two or more possible solutions to achieve the ECO; ranking the two or more possible solutions based on two or more factors; and selecting the highest ranked solution.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1A:
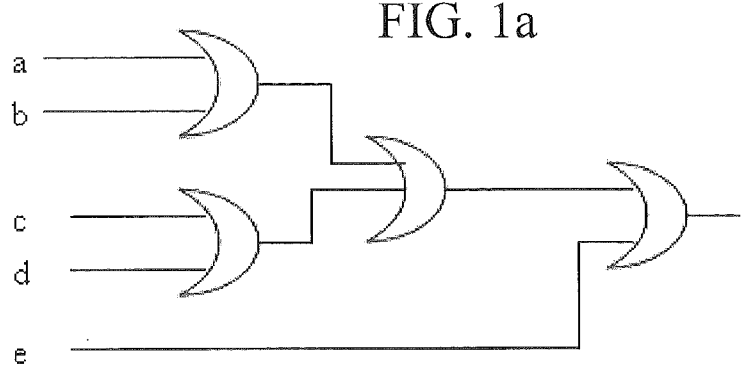
FIGS. 1a-1b show different configurations of a circuit before (FIG. 1a) and after (FIGS. 1b-1d) possible ECO changes are made.
Figure 1B:
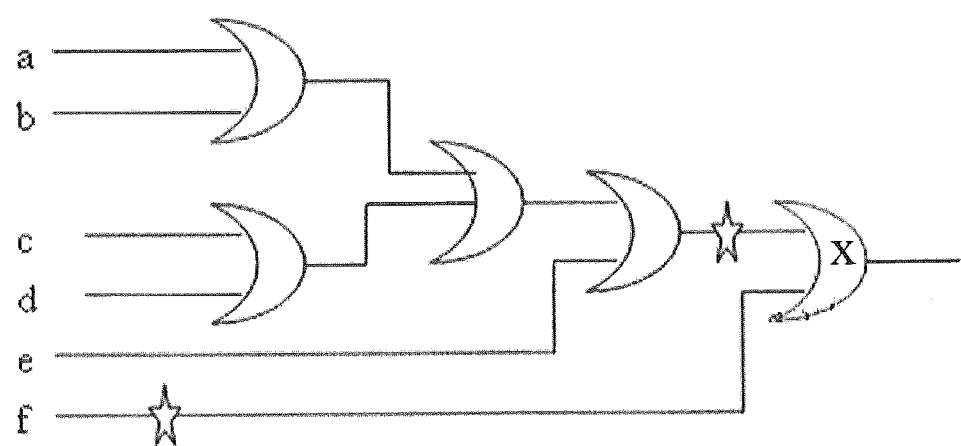
Figure 1C:
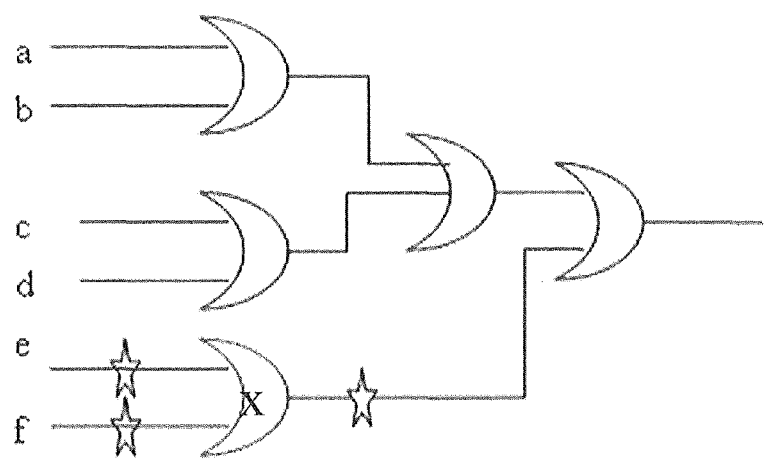
Figure 1D:
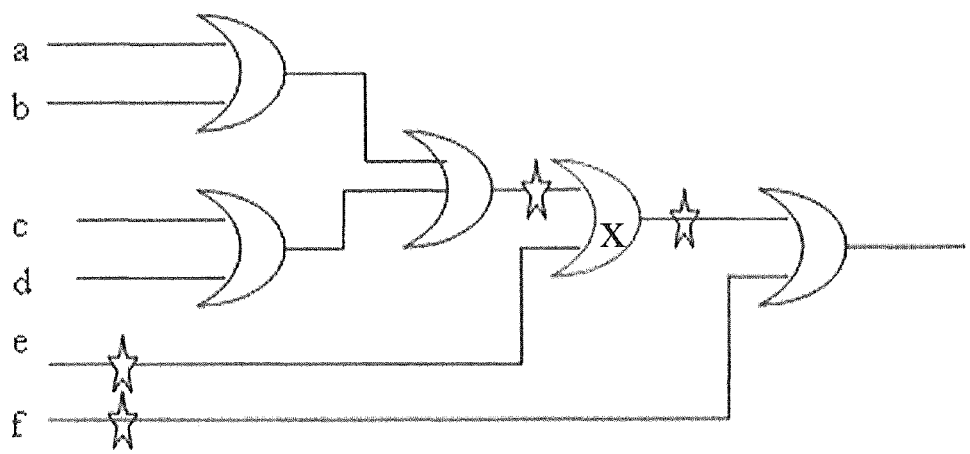

FIG. 1a shows an example of logic gates connected to perform to logical operation a+b+c+d+e. FIGs. 1b-1c show three different manners in which the circuit of FIG. 1 may be modified to change its logical operation to a+b+c+d+e+f. In each of a new OR gate is added and is marked with an X. It shall be noted that while in all cases a single gate is added, the locations where it is added and the new connections that are needed different in each figure. In particular, the locations where then new connections are added are shown as stars and are referred to as "stitch points" herein.

As another example, assume that a first logic is replicated in three places in the design. Suppose also that an ECO is provided that requires simply that some logic be placed between the first logic and a second logic. Given that there are three "first logics" it follows that that there are three locations where the ECO could be stitched into the netlist.

In the above examples there are multiple solutions to a single ECO. In such a case, the extractor disclosed herein selects the one that meets certain criteria. In more detail, a computing device receives both the original placed netlist and ECO specification. The computing device further receives the placement information and placement grids with cell density of the original implementation. Further, a grid based routing congestion map of the original implementation is received as well as the timing information of all the paths of the circuit. The density grid and congestion grid are combined to form combined density and congestion map of the circuit. Possible stitch points are selected that meet the ECO. To each point needs to pass not only logical compliance with the ECO but also meet one or more congestion, density, timing and placement information requirements. In one embodiment, one or more of congestion, density, timing and placement scores are formed for each solution. Different weights can be assigned to each of these. The solution with the highest score may then be selected. In the event of tie, in one embodiment, the tie may be broken in the following order: routing congestion, timing, placement density and cell density.

Figure 2:
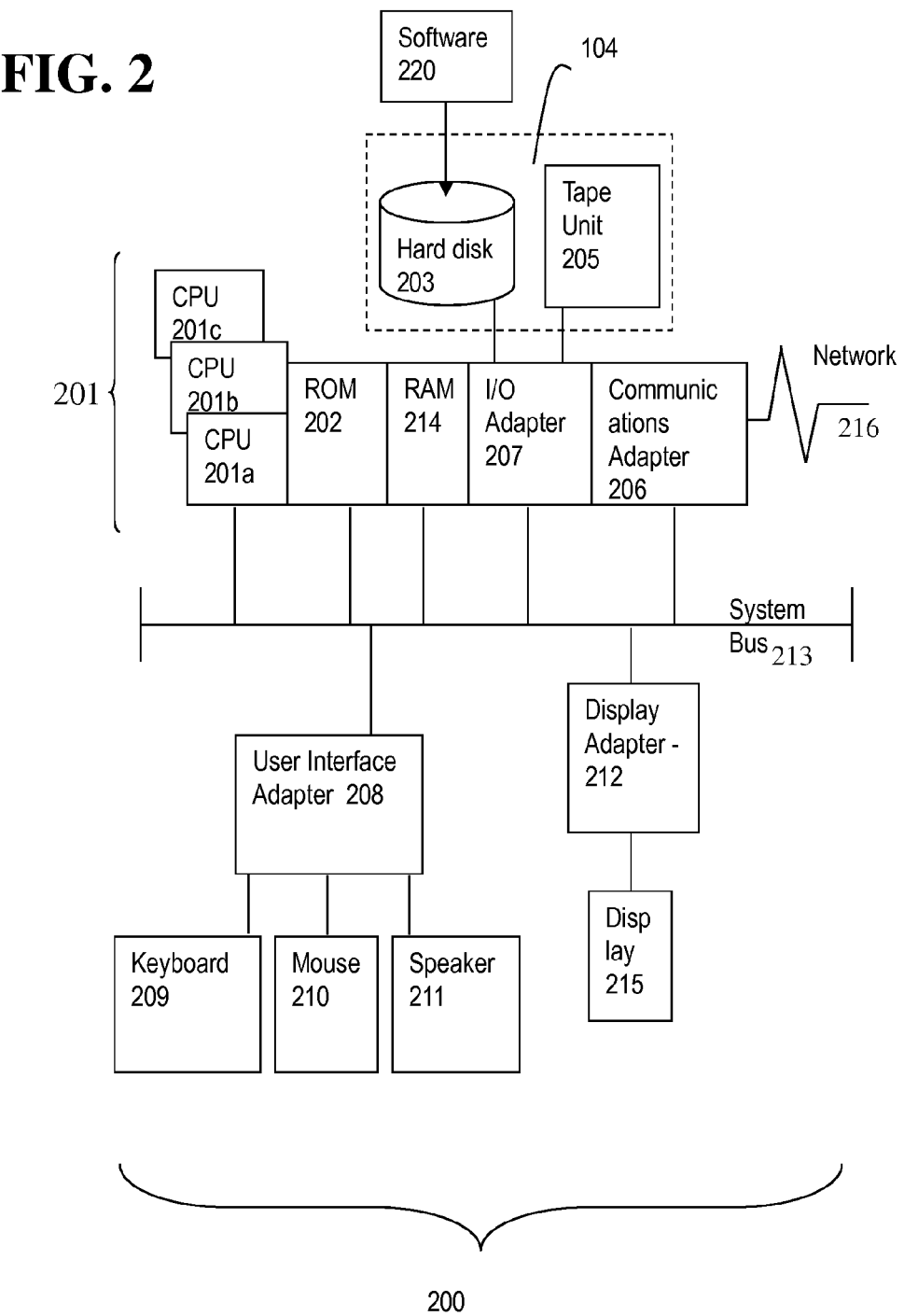
FIG. 2 shows an example of computing system on which embodiments of the invention may be implemented.

FIG. 2 shows an example of a computing system 200 on which embodiments of the present invention may be implemented. In this embodiment, the system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of the system 200.

FIG. 2 further depicts an input/output (I/O) adapter 207 and a network adapter 206 coupled to the system bus 213. The I/O adapter 207 may be a small computer system interface (SCSI) adapter that communicates with a hard disk 203 and/or tape storage drive 205 or any other similar component. The I/O adapter 207, hard disk 203, and tape storage device 205 are collectively referred to herein as mass storage 204. A network adapter 206 interconnects bus 213 with an outside network 216 enabling the computing system 200 to communicate with other such systems. A screen (e.g., a display monitor) 215 is connected to system bus 213 by a display adaptor 312, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 213 via user interface adapter 208 and display adapter 212. A keyboard 209, mouse 210, and speaker 211 are all interconnected to bus 313 via user interface adapter 208, which may include, for example, a Super I/O chip integrating multiple device adapters into a single integrated circuit.

Thus, as configured in FIG. 2, the system 200 includes processing means in the form of processors 201, storage means including system memory 214 and mass storage 204, input means such as keyboard 209 and mouse 210, and output means including speaker 211 and display 215.

It will be appreciated that the system 200 can be any suitable computer or computing platform, and may include a terminal, wireless device, information appliance, device, workstation, mini-computer, mainframe computer, personal digital assistant (PDA) or other computing device. It shall be understood that the system 200 may include multiple computing devices linked together by a communication network. For example, there may exist a client-server relationship between two systems and processing may be split between the two.

The system 200 also includes a network interface 206 for communicating over a network 216. The network 216 can be a local-area network (LAN), a metro-area network (MAN), or wide-area network (WAN), such as the Internet or World Wide Web. Users of the system 200 can connect to the network through any suitable network interface 206 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 200 includes machine-readable instructions stored on a non-transitory tangible machine readable media (for example, the hard disk 203) for capture and interactive display of information shown on the screen 215 of a user. As discussed herein, the instructions are referred to as "software" 220. The software 220 may be produced using software development tools as are known in the art. The software 220 may include various tools and features for providing user interaction capabilities as are known in the art.

Figure 3:
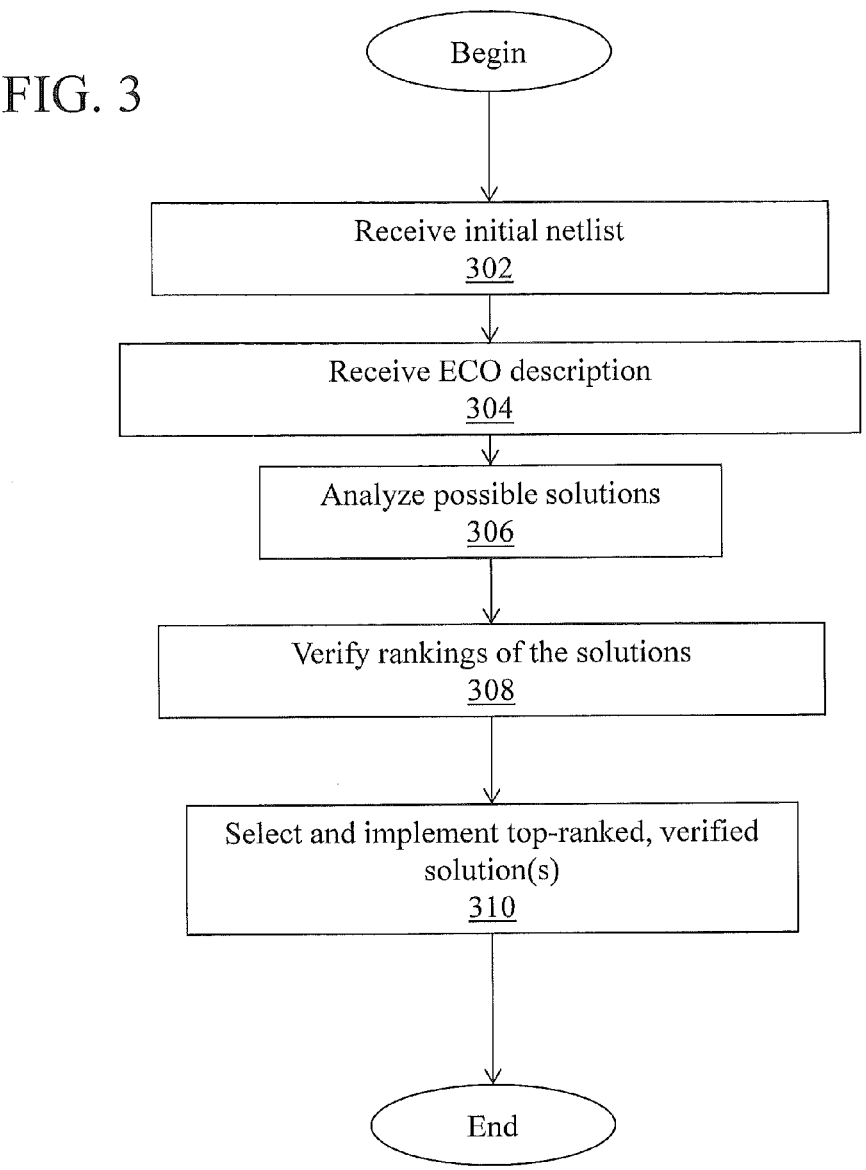
FIG. 3 is a flow diagram depicting one method of executing an ECO.

FIG. 3 is a flow diagram depicting one method of executing an ECO. At block 300 an initial netlist is received. The netlist includes a listing of the all the connections for a particular integrated circuit. At block 302 the netlist is analyzed to determine certain information about the connections contains therein. This analysis can be performed separately and received from either another location or or may be stored in memory from either a current or prior analysis of the netlist.

At block 304 the ECO description is received. The description may be electronic or received in any other manner. At block 306 possible solutions that logically implement the ECO are formed. Examples of different types of solutions are described above. It should be understood that those examples are not limiting. In the above examples, each of the possible solutions will include at least one new gate and one stitch point. Of course, the At block 306 an analysis of the possible solutions is performed. The analysis includes ranking the possible solutions. A further description of the analysis and ranking is provided below but it shall be understood that the analysis may include consideration on one or more of: congestion, density, timing and placement information requirements. Such an analysis will include, to the extent necessary, consideration of the physical layout of the integrated circuit prior to the ECO. Thus, the analysis of the solutions may include one or both of congestion or density analysis of the physical layout in, for example, a map. In one embodiment, a map of density and congestion overlaid on each other may be created. Density, as used herein, shall refer to a measure of how many circuit elements (e.g., logic gates, transistors, etch.) are located in a particular unit of area. Congestion, as the term is used herein, shall refer to the number or density of electrical connections in a particular area or volume. The electrical connects can include, for examples wiring between logical elements on a single layer and vias between layers. The area can be on a single layer or span multiple layers (e.g., a vertical area). Congestion analysis may help reduce capacitive effects of wires that are too close together.

At block 308 the rankings of the solutions are verified. Verification may be a separate step in one embodiment but can be part of the analysis/ranking performed at block 308. In short, the verification may include determining if the top ranked solution violates any rules of the circuit or is physically impossible given the current physical layout. An example of a rule violation includes the situation were the addition of a logic gate into a particular path may cause that path to become a critical path. That is, in some cases, a particular path may include components (e.g., logic gates or cells) that are placed such that introduction of addition wiring (or a long wiring run) may cause the path traversal time to exceed a predetermined limit (such as one clock period or a multiple thereof). For a particular path, a timing analysis tool can be run to determine the path delay. The path delay can include the sum of propagation delays between endpoints of two components, as well as the delay resulting from the operation of the components. Each time a data processing system reroutes or otherwise impacts delay of a circuit, the timing analysis tool may be used to establish a new delay for the path. One of the steps that illustrative embodiments may perform is determining whether the paths created by any of the selected solutions violated timing requirements set for that path (e.g., are less than one clock period). Such timing requirements, or goals, are set by circuit designers in accordance with design objectives. A critical path is a path that has a timing delay that exceeds a timing threshold. Another example of a violation may exist if the solution is physically impossible to implement. Such a determination may be made by utilizing known analysis tools.

At block 310, the top-ranked, verified solution(s) are selected and implemented. The selection/implementation may include proving an indication of the selected solutions to the circuit designer in one embodiment. In another embodiment the solution is automatically input into the netlist and a new layout is created. In yet another embodiment, the change is only implemented in the description of the physical layout.

Figure 4:
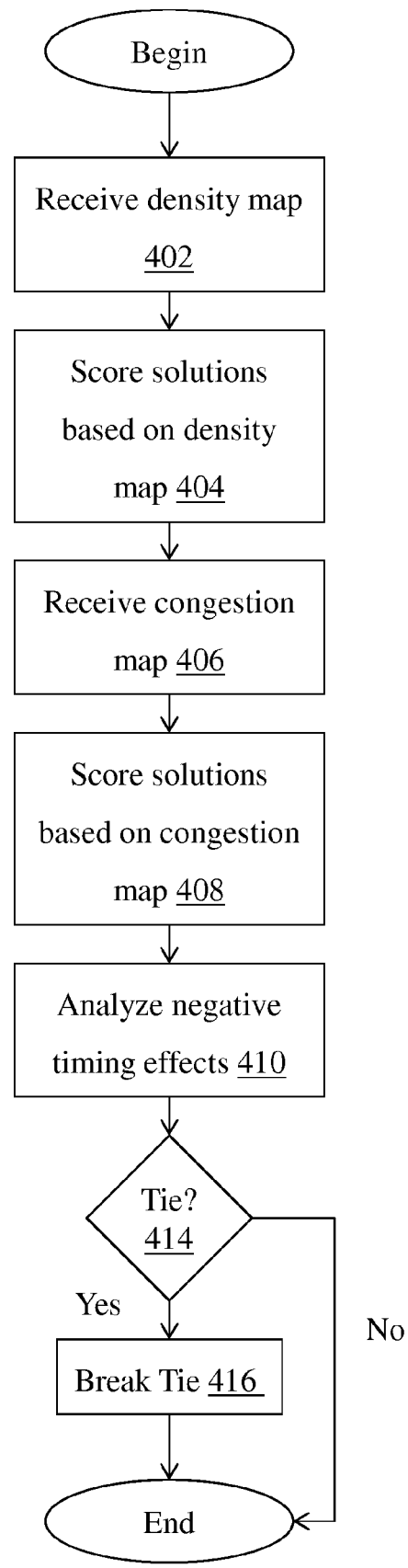
FIG. 4 is flow diagram depiction one method of ranking ECO solutions.

As discussed above, one embodiment includes ranking possible solutions that effectuate the ECO. The rankings may include consideration on one or more of: congestion, density, timing and placement information requirements. With reference now to FIG. 4 a method of ranking possible solutions is illustrated. While the following discussions describes a series of possible factors on which the solution may be ranked, it shall be understood that any combination of the factors may be utilized. Further, other factors than those described above could be considered. Also, it shall be understood that only a single factor could be utilized in one embodiment and the ordering if the blocks could be varied. Further, as described above, the density and congestion maps could be combined before being received or combined after being received. In such a case, blocks described below may be combined as will be understood by the skilled artisan.

At block 402 a density map is received. The map may be formed from an analysis of the physical layout formed prior to the ECO. Known tools may be utilized in the formation of the density map. The density can include both cell and placement density information. At block 404 the one or more solutions then given a score based on a comparison with the density map. The comparison may give a higher score to a solution that places a logic gate in a location that is less dense than other locations. One of ordinary skill will that the particular system of ranking this factor or any other factor can vary and can include a strict numerical ranking of the solutions or a score based on a scale. In the second instance it is possible that multiple solutions may achieve the same score. Further, the density score may include two or more scores. For example, the score may include separate cell and placement density scores.

At block 406 a congestion map is received. As above, the map may be formed from an analysis of the physical layout formed prior to the ECO and known tools may be utilized in the formation of the congestion map. At block 408 the one or more solutions then given a score based on a comparison with the congestion map. The comparison may give a higher score to a solution that places a logic gate in a location that runs wires/traces through routes that are less congested than other locations.

At block 410 an analysis of negative timing effects is performed on the solutions. This analysis may include determining how much additional time the solution adds to a path in which it is implemented. Further, such an analysis may include determining if a particular path becomes a critical path.

At block 412 the scores for each of the solutions are totaled. It shall be understood that the as part of forming this total different weights may be assigned to each of the factors. If a tie exists, as determined at block 414, the tie is broken at block 416. According to one embodiment, the order in in which a tie is broken in based on the scores in the following order: routing congestion, timing, placement density and cell density.

The above description provides the skilled artisan a framework for implementing an ECO. Of course, many other steps or considerations could be included. Further, many of the steps described above are shown as singular steps. It shall be understood that many of them be performed recursively or repeatedly until a particular result is achieved.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for designing an integrated circuit, the method comprising:
    receiving a netlist;
    receiving physical layout information related to an integrated circuit based on the netlist;
    receiving an engineering change order (ECO) that adds at least one logic gate to the physical layout;
    forming two or more possible solutions to achieve the ECO;
    ranking the two or more possible solutions based on two or more factors to obtain a highest ranked solution; and
    selecting the highest ranked solution;
    wherein ranking includes determining that a tie between solutions exists and the tie is broken based, in order, on scores for routing congestion, timing, placement density and cell density.

2. The method of claim 1, wherein the physical layout information includes layout and routing information.

3. The method of claim 1, wherein forming includes extracting one or both of a cell density map and a congestion map from the physical layout information.

4. The method of claim 3, wherein the ranking includes scoring the solutions based on a comparison to one or more of the cell density map and the congestion map.

5. The method of claim 1, wherein the ranking includes scoring the solutions based on a comparison to a timing analysis of the netlist.

6. A computer program product for implementing designing an integrated circuit, the computer program product comprising:
    a tangible storage medium readable by a processing circuit and storing instructions which, when executed by the processing circuit performs a method comprising:
    receiving a netlist;
    receiving physical layout information related to an integrated circuit based on the netlist;
    receiving an engineering change order (ECO) that adds at least one logic gate to the physical layout;
    forming two or more possible solutions to achieve the ECO;
    ranking the two or more possible solutions based on two or more factors to obtain a highest ranked solution; and selecting the highest ranked solution;
wherein ranking includes determining that a tie between solutions exists and, the tie is broken based, in order, on scores for routing congestion, timing, placement density and cell density.

7. The computer program product of claim 6, wherein the physical layout information includes layout and routing information.

8. The computer program product of claim 6, wherein forming includes extracting one or both of a cell density map and a congestion map from the physical layout information.

9. The computer program product of claim 8, wherein the ranking includes scoring the solutions based on a comparison to one or more of the cell density map and the congestion map.

10. The computer program product of claim 6, wherein the ranking includes scoring the solutions based on a comparison to a timing analysis of the netlist.

* * * * *